US009829200B2

(12) United States Patent
Gao et al.

(10) Patent No.: US 9,829,200 B2
(45) Date of Patent: Nov. 28, 2017

(54) BURNER ARRANGEMENT AND METHOD FOR OPERATING A BURNER ARRANGEMENT

(71) Applicant: ALSTOM Technology Ltd, Baden (CH)

(72) Inventors: Xianfeng Gao, Niederrohrdorf (CH); Urs Benz, Gipf-Oberfrick (CH); Andre Theuer, Baden (CH); Rohit Kulkarni, Muelligen AG (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 685 days.

(21) Appl. No.: 14/445,485

(22) Filed: Jul. 29, 2014

(65) Prior Publication Data

US 2015/0047364 A1   Feb. 19, 2015

(30) Foreign Application Priority Data

Aug. 16, 2013   (EP) .................................... 13180642

(51) Int. Cl.
*F23R 3/28*   (2006.01)
*F23R 3/42*   (2006.01)
(Continued)

(52) U.S. Cl.
CPC .................. *F23R 3/42* (2013.01); *F02C 3/14* (2013.01); *F23C 7/004* (2013.01); *F23R 3/20* (2013.01); *F23R 3/28* (2013.01); *F23R 3/286* (2013.01); *F23R 3/346* (2013.01); *F23R 3/36* (2013.01); *F23R 3/46* (2013.01); *F05D 2220/32* (2013.01); *F05D 2240/35* (2013.01);
(Continued)

(58) Field of Classification Search
CPC .. F23R 2900/03341; F23R 3/286; F23R 3/42; F23R 3/346; F23R 3/36; F23R 3/46; F23C 2900/07002; F23D 2900/1404; F23D 2900/14021
See application file for complete search history.

(56) References Cited

U.S. PATENT DOCUMENTS 2,979,899 A   4/1961   Salmon et al.
4,932,861 A   6/1990   Keller et al.
(Continued)

FOREIGN PATENT DOCUMENTS

EP   0 321 809 B1   5/1991
EP   2 522 912 A1   11/2012
EP   1 434 007 B1   5/2013

*Primary Examiner* — William H Rodriguez
(74) *Attorney, Agent, or Firm* — Buchanan Ingersoll & Rooney PC (57) ABSTRACT

The invention relates to a burner arrangement for using in a single combustion chamber or in a can-combustor comprising a center body burner located upstream of a combustion zone, an annular duct with a cross section area, intermediate lobes which are arranged in circumferential direction and in longitudinal direction of the center body. The lobes being actively connected to the cross section area of the annular duct, wherein a cooling air is guided through a number of pipes within the lobes to the center body and cools beforehand at least the front section of the center body based on impingement cooling. Subsequently, the impingement cooling air cools the middle and back face of the center body based on convective and/or effusion cooling. At least the back face of the center body includes on the inside at least one damper.

15 Claims, 4 Drawing Sheets

(51) Int. Cl.
  F23R 3/20     (2006.01)
  F23C 7/00     (2006.01)
  F23R 3/34     (2006.01)
  F02C 3/14     (2006.01)
  F23R 3/36     (2006.01)
  F23R 3/46     (2006.01)

(52) U.S. Cl.
  CPC .. *F05D 2260/201* (2013.01); *F05D 2260/232* (2013.01); *F23D 2900/14004* (2013.01); *F23D 2900/14021* (2013.01); *F23R 2900/03041* (2013.01); *F23R 2900/03043* (2013.01); *F23R 2900/03044* (2013.01); *F23R 2900/03341* (2013.01)

(56) References Cited

U.S. PATENT DOCUMENTS

| | | | |
|---|---|---|---|
| 5,118,283 A * | 6/1992 | Sattelmayer | F23C 7/06 431/11 |
| 5,385,015 A * | 1/1995 | Clements | F23R 3/20 60/39.826 |
| 5,431,018 A | 7/1995 | Keller | |
| 5,482,457 A * | 1/1996 | Aigner | F23D 17/002 431/10 |
| 5,511,375 A * | 4/1996 | Joshi | F01D 9/065 239/403 |
| 5,626,017 A | 5/1997 | Sattelmayer | |
| 6,082,111 A | 7/2000 | Stokes | |
| 2002/0187448 A1 | 12/2002 | Eroglu et al. | |
| 2012/0297777 A1 | 11/2012 | Poyyapakkam et al. | |
| 2014/0109588 A1* | 4/2014 | Ciani | F23R 3/286 60/776 |
| 2014/0123665 A1* | 5/2014 | Wood | F23R 3/346 60/774 |
| 2015/0047365 A1* | 2/2015 | Duesing | F23R 3/20 60/776 |
| 2016/0146468 A1* | 5/2016 | Gao | F01D 5/189 60/742 |
| 2016/0146470 A1* | 5/2016 | Dusing | F23R 3/286 60/737 |

* cited by examiner

BURNER ARRANGEMENT AND METHOD FOR OPERATING A BURNER ARRANGEMENT

CROSS-REFERENCE TO RELATED APPLICATIONS

This application claims priority to European application 13180642.4 filed Aug. 16, 2013, the contents of which are hereby incorporated in its entirety.

TECHNICAL FIELD

The invention relates to a burner arrangement for using in a single combustion chamber or in a can-combustor comprising a center body burner located upstream of a combustion zone, an annular duct with a cross section area, intermediate lobes which are arranged in circumferential direction and in longitudinal direction of the center body burner, wherein the lobes being actively connected to the cross section area of the annular duct. In addition, the invention relates to a method for operating a burner arrangement.

BACKGROUND

In order to achieve a high efficiency, a high turbine inlet temperature is used in standard gas turbines. As a result, there arise high NOx emission levels and higher life cycle costs. This can be mitigated with a sequential combustion cycle, wherein the compressor delivers nearly double the pressure ratio of a known one. The main flow passes the first combustion chamber (e.g. using a burner of the general type as disclosed in EP 0 321 809 or as in U.S. Pat. No. 4,932,861, also called EV combustor, where the EV stands for environmental), wherein a part of the fuel is combusted. After expanding at the high-pressure turbine stage, the remaining fuel is added and combusted (e.g. using a burner of the type as disclosed in U.S. Pat. Nos. 5,431,018 or 5,626,017 or in U.S. Patent Application Publication No. 2002/0187448, also called a SEV combustor, where the S stands for sequential). Both combustors contain premixing burners, as low NOx emissions involve high mixing quality of the fuel and the oxidizer.

US 2012/0297777 A1 discloses a known secondary burner. The burner, which is an annular combustion chamber, is bordered by opposite walls. These opposite walls define the flow space for the flow of oxidizing medium. This flow enters as a main flow from the high pressure turbine (e.g., behind the last row of rotating blades of the high pressure turbine which is located downstream of the first combustor). This main flow enters the burner at the inlet side. First this main flow passes flow conditioning elements, which are typically turbine outlet guide vanes which are stationary and bring the flow into the proper orientation. Downstream of these flow conditioning elements vortex generators are located in order to prepare for the subsequent mixing step. Downstream of the vortex generators there is provided an injection device or fuel lance 7 which can include a foot and an axial shaft. At the most downstream portion of the shaft fuel injection takes place; in this case fuel injection takes place via orifices/nozzles which inject the fuel in a direction perpendicular to flow direction (cross flow injection). Downstream of the fuel lance there is the mixing zone, in which the air, bordered by the two walls, mixes with the fuel and then at the outlet side exits into the combustion space where self-ignition takes place.

SUMMARY

This object is achieved by providing a burner, in particular for a secondary combustion chamber of a gas turbine with sequential combustion having a first and a second combustion chamber, with an injection device for the introduction of at least one gaseous fuel into the burner, wherein the injection device of this burner has at least one center body which is arranged in the burner arrangement and wherein this center body has at least one nozzle for introducing at least one liquid and/or gaseous fuel into the burner.

If the combustion system is required to be configured in a can-combustor system, then an axial-symmetric design, e.g. a cylindrical design, is clearly attractive. However, this introduces a significant further issue when applying the concept of flutes, because of the increased circumferential mixing needed at larger radii due to the increased separation of the flutes.

It is an object of the invention to provide a center body burner cooling concept for exemplary embodiments of the present disclosure provide a premixed burner, for example, applicable to a 1st stage combustor in a 2-stage combustion system or to a single combustion burner system. The exemplary embodiments can provide rapid mixing achievable, for example, for highly reactive fuels with acceptable burner pressure drops. Exemplary embodiments of the disclosure can provide rapid fuel-air mixing occurring in short burner-mixing lengths. The burner can be usable, for example, but not exclusively for high reactivity conditions, i.e., for a situation where high reactivity fuels, specifically MBtu fuels, shall be burned in such a burner.

Additionally, exemplary embodiments of the disclosure relate to a burner for a single combustion chamber or first combustion chamber of, for example, a gas turbine, with an injection device for the introduction of at least one gaseous and/or liquid fuel into the burner. The injection device has at least one body which is arranged in the burner with at least one nozzle for introducing the at least one fuel into the burner. The at least one body is located in a first section of the burner with a first cross-sectional area at a leading edge of the at least one body with reference to a main flow direction prevailing in the burner. Downstream of this, a mixing zone is located with a second cross-sectional area.

Furthermore, exemplary embodiment of the disclosure relates to a cooling concept of a center body burner for "Constant Pressure Sequential Combustion" (CPSC). The cooling air is guided through the pipes within the lobes to the center body. Firstly, the cooling air cools the front face of the center body with an impingement cooling concept. Secondly, after the impingement cooling the same cooling air cools the upstream of the front face arranged middle face of the center body burner with a convective cooling (convective heat transfer) and/or an effusion cooling and then the back face with preferentially an effusion cooling.

Fundamentally, the burner arrangement comprising a center body burner located upstream of a combustion zone, an annular duct with a cross section area, intermediate lobes which are arranged in circumferential direction and in longitudinal direction of the center body burner, wherein the lobes being actively connected to the cross section area of the annular duct. A cooling air is guided through a number of pipes within the lobes to the center body burner and based on impingement cooling cools beforehand at least the front section of the center body burner and in a subsequent flow the impingement cooling air based on convective and/or effusion cooling cools the middle and back face of the center body burner. At least the back face of the center body burner includes on inside at least one damper.

The mentioned damper, especially designed as a low and/or high frequency damper, is interiorly integrated in the center body. The assembly between the damper element and front face of the center body is done by means of a bayonet look and by means of securing elements with a screw and, if required, with locking weld.

Downstream of the lobes a mixing zone is located, and wherein at and/or downstream of said lobes the cross-section of said mixing zone is reduced, wherein preferably this reduction is at least 10%, more preferably at least 20%, even more preferably at least 30%, compared to the flow cross-section upstream of said lobes; or said mixing zone is enlarged, wherein preferably this enlargement is at least 10%, more preferably at least 20%, even more preferably at least 30%, compared to the flow cross-section upstream of said lobes. Moreover, said mixing zone has the shape of a diffusor.

Accordingly, the cooling concept for the center body burner can be further optimized and improved with more features:

The front section of the center body burner having an impingement cooling cavity disposed between the rear side of the front section of the center body burner and the impingement cooling inner wall.

The cooling air from cavity is directly or indirectly connected with the transition duct in longitudinal direction of the middle face and in longitudinal direction of a subsequent annular channel within the back face of the center body burner.

The diameters and number of the impingement holes for cooling the front face could be optimized to achieve evenly distributed cross flows under the impingement cooling channels on the front tip.

The impingement cooling channel height does not include necessarily constant height to optimize the cross cooling flows.

Some ribs could be arranged in flow direction within the impingement cooling channels to guide the flows.

Some bypass holes could be added on the wall to bypass cooling flows from impingement area to center body burner plenum, which helps to adjust the pressure level within the center body burner plenum and increase the back flow margin.

Film cooling instead of effusion cooling could be implemented on some hot spot on the downstream of the inner liner of the center body burner.

According to an exemplary center body burner of the disclosure, at and/or downstream of the body, the cross-sectional area is reduced, such that the first cross-sectional area is larger than the second cross-sectional area. In other words the cross-section available for the flow of combustion gases at the leading edge of the at least one body is larger than the cross-section available for the flow of combustion gases in the mixing zone. This reduction of the cross-section can lead to an increase of the flow velocity in longitudinal direction of this flow path.

The center body burner can be applied in the context of annular combustors but also in the context of can-architecture, wherein individual burner cans feed hot combustion gas into respective individual portions of an arc of the turbine inlet vanes. Each can-combustor includes a plurality of main burners disposed in a ring around a central pilot burner, as for example in U.S. Pat. No. 6,082,111 or EP 1 434 007 B1.

The center body burner is used as burner for a combustion chamber of a gas turbine group, wherein the gas turbine group comprising at least one compressor unit 2, a first combustion chamber 3 for generating working gas, wherein the first combustion chamber 3 connected to receive compressed air from the compressor unit 2, wherein the first combustion chamber 3 being an annular combustion chamber having a plurality of premixing burners, a first turbine 4 connected to receive working gas from the first combustion chamber 3, a second combustion chamber 5 connected to receive exhausted working gas from the first turbine 4 and deliver working gas to the second turbine 6. The second combustion chamber 5 comprises an annular duct forming a combustion space extending in a flow direction from outlet of the first turbine to an inlet of the second turbine 6, and the second combustion chamber 5 comprising means for introducing fuel into the second combustion chamber 5 for self-ignition of the fuel.

Furthermore, the center body burner is used as burner for a combustion chamber of a gas turbine group, wherein the gas turbine group comprising at least one compressor unit, a first combustion chamber for generating working gas, wherein the first combustion chamber connected to receive compressed air from the compressor unit, wherein the first combustion chamber being an annular combustion chamber having a plurality of premixing burners, a first turbine connected to receive working gas from the first combustion chamber, a second combustion chamber connected to receive exhausted working gas from the first turbine and deliver working gas to the second turbine. The second combustion chamber is operating as a can-combustor which is designated as self-contained cylindrical or quasi-cylindrical combustion chamber, and the can-combustor comprising means for introducing fuel into the second combustion chamber for self-ignition of the fuel. In this context, multiple can-combustors are arranged around the central axis of the gas turbine group.

Exemplary embodiments of the disclosure can include aerodynamically facilitated axial fuel injection with mixing enhancement via small sized vortex generators and/or flutes. As a result, the premixed burner can operate for increased fuel flexibility without suffering on high NOx emissions or flashback. The proposed burner configuration is applicable for both annular and can-annular combustors. Flame stabilization can be achieved by pushing the vortex breakdown occurrence to the burner exit. The burner velocities, the axial pressure gradient, the dimensions of the bodies and optionally arranged vortex generators can be varied to control the vortex breakdown to occur near the burner exit.

Distributed at the circumference of the center body there are a number of radial arranged streamlined center body lobes within the annular duct, as bond-bridge of the flow gap. The streamlined center body lobes have a longitudinal axis, which are arranged normal to the longitudinal axis of the injection plan and normal to the inlet flow direction, which in this example is parallel to the longitudinal axis. To assure good mixing a flow field with turbulent dissipation is induced over the complete cross section of the flow path by arranging two or more streamlined center body lobes in the flow path.

The streamlined center body lobes have essentially the same periodicity, but in/or out of phase, i.e. the number of flutes at the trailing edge of each streamlined center body lobe is preferably identical and the flutes on neighboring streamlined center body lobes are preferably arranged in in-of-phase. In particular the phases are shifted by 180°, i.e. the flutes of both streamlined center body lobes cross the center line at the same position in longitudinal direction, and at the same position in longitudinal direction the deflection of each body has the same absolute value but is in opposite direction. In longitudinal or quasi-longitudinal direction of the trailing edge at least one fuel nozzle and/or a fuel nozzle are located on the central plane of the trailing edge of the streamlined center body lobes, and preferably et each position in the plane of each adjacent flute, located at opposite lateral surface of the streamlined center body lobes.

A further preferred embodiment is characterized in that the injection plane (lobe) consists of at least one injection device that is disposed radially or quasi radially to the center body. The injection device for the introduction of at least one fuel into the annular duct of the burner has at least one streamlined body which is arranged in the annular space of the burner comprising at least one nozzle for introducing the at least one fuel into the annular duct of the burner.

A further preferred embodiment is characterized in that the injection plane consists beforehand also of at least one injection device that is disposed radially or quasi radially to the center body. The streamlined bodies having at its downstream end a number of lobes which are arranged with respect to one or more neighboring streamlined bodies in phase/or out of phase with each other. In this case the fuel nozzle or fuel nozzles are arranged concentrically at the lobes. Each nozzle arrangement is preferentially located where the lobed trailing edge crosses the center plane. Referring to the fuel nozzles an arrangement propounds first nozzles for injection of liquid fuel, are enclosed by second nozzles for injection of a gaseous fuel, which themselves are encloses by third nozzles or injection of carrier air.

The center body lobe and the integrated leading flute edge possess an optimized cooling technique.

Essentially, the lobing is much more pronounced, meaning the height h is much larger compared with the width W of each flute. So in this case, the height (H) of the lobing is approximately twice the maximum width (W) of the body at its maximum width position in the upstream portion thereof. Depending on the desired mixing properties, the height of the lobing can be adapted, also in longitudinal direction of the trailing edge of one flute the height may vary.

As an example, the injector can be part of a center body, as described herein. The main flow is passing the lobed mixer, resulting in velocity gradients. These result in intense generation of shear layers, into which fuel can be injected. The lobe angles are chosen in such way to avoid flow separation. The streamlined body has a leading edge and a trailing edge. The leading edge defines a straight line and in the leading edge portion of the shape the shape is essentially symmetric, so in the upstream portion the body has a rounded leading edge and no lobing. The leading edge extends in direction of the longitudinal axis of the flute. Downstream of this upstream section the lobes successively and smoothly develop and grow as one goes further downstream towards the trailing edge. In this case the lobes are given as half circles sequentially arranged one next to the other alternating in the two opposite directions in longitudinal direction of the trailing edge.

The advantages of the above identified designs are that:
For a predefined post injection mixing volume and length any burner external diameter can be achieved through the appropriate choice of center body diameter.

Burner hardware can be set out to provide appropriate dimensions for downstream components, for example the combustion chamber or turbine components.

The radial or quasi-radial divergence of neighboring flutes is minimized by the small height of the annular duct. This ensures the applicability of previous flute experience is maintained.

The small radial divergence of neighboring flutes in longitudinal direction of lobes minimizes the requirement for increased circumferential mixing, relatively to the center body, at the outboard end of the flute. This ensures good mixing characteristics are maintained.

The center body provides an appropriate location to mount damping elements.

Additionally, if air addition is required prior to the reheat combustion zone this can be added over the center body.

Additionally, other advantages can be summarized as follows:

Higher burner velocities to accommodate highly reactive fuels.

Lower burner pressure drop for similar mixing levels achieved with current designs.

SEV (Sequential combustion chamber) is operable at higher inlet temperatures.

Possibility to remove or replace high-pressure carrier air with lower pressure carrier air.

With respect to performing a reasonable fuel air mixing, the following components of current burner systems are of interest:

At the entrance of the SEV combustor, the main flow must be conditioned in order to guarantee uniform inflow conditions independent of the upstream disturbances, e.g. caused by the high-pressure turbine stage.

Then, if required, the flow must pass a number of flutes.

Homogeneous mixing of fuel and combustion air with minimum pressure drop are the preconditions for the design of highly efficient modern gas turbines. Homogeneous mixing is required to avoid local maxima in the flame temperature, which lead to high NOx emissions. Low pressure drops are advantageous because the pressure drop in the combustor is directly impairing power and efficiency of a gas turbine

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same.

In the drawings.

DETAILED DESCRIPTION

Figure 1A:
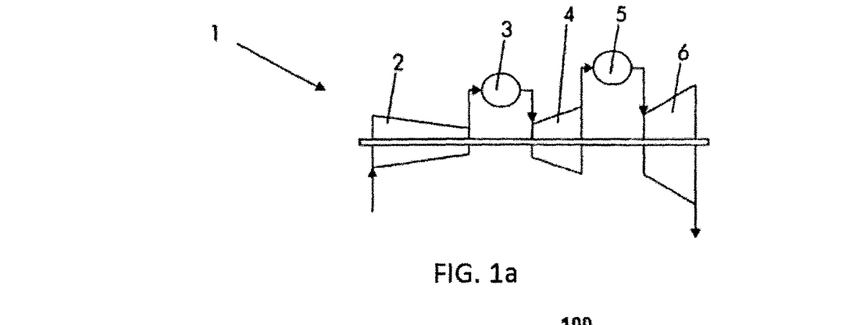
FIG. 1a shows a system having a gas turbine group.
Figure 1B:
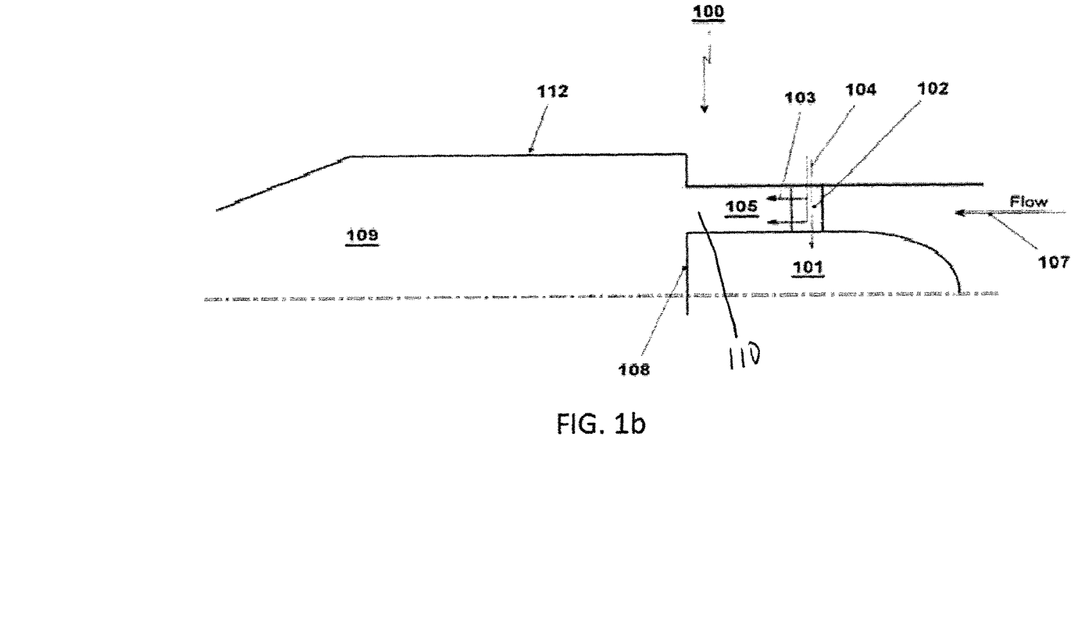
FIG. 1b shows a reheat burner arrangement which incorporates a center body.

FIG. 1b shows a reheat burner arrangement 100 which incorporates a center body 101. The shown center body starts upstream of an injection plane 102 (lobe), causing the fuel 103 and carrier air 104 to be injected into the center body 101, and then the center body continues downstream to the exit 108 of the burner arrangement 100. The center body 101 is being actively connected to the main flow 107 of hot gases. The center body 101 provides better mixing matches burner and combustor area. With respect to a premix burner according to the present invention the center body 101 can be provided with a fuel supply line (not shown). The center body 101 exhibits at its end 108 in the flow direction of the main flow 107 a cylindrical or quasi-cylindrical end with respect to the cross-sectional area between the annular duct 105 and the afterwards combustion chamber 109. A whole, partial or intermediate conical topography of the center body's surface with respect to the cross sectional area of the annular duct is, as required, also possible. The center body 101 with respect to the adjacent elements can be designed with different dimensions, especially with respect to the cross sectional area of the annular duct and the combustion chamber.

Accordingly, the proposed reheat burner arrangement in FIG. 1b is shown with non-reduced exit cross-section area 110 of the annular duct 105 with respect to the combustion chamber 109. In this case downstream of an inlet side of the burner arrangement there is located the center body 101 and intermediate in longitudinal direction of the length of the center body 101 and within the cross-section area of the annular duct 105 there is located circumferentially fuel injection planes (lobes) 102, which is given as a streamlined body extending in longitudinal direction.

At the position where the streamlined body is located, or downstream of this location, at least the outer wall of the annular duct 105, if required, converge in a converging portion (not shown) and narrow down to a reduced cross-sectional area of the annular duct. This defines the mixing space 110, which ends at the outlet side 108 where the mixture of fuel and air enters the combustion chamber or combustion space 109, which is delimited by walls 112. Downstream of such a converging portion the cross-sectional area of the annular duct, if required, may be progressively, also forming the shape of a diffuser.

Relating to the injection plane (lobe) 102 homogeneous mixing of fuel 103 and, if required, combustion air 104 with minimum pressure drop are preconditions for the design of highly efficient modern gas turbines. Homogeneous mixing is required to avoid local maxima in the flame temperature, which lead to high NOx emissions. Low pressure drops are advantageous because the pressure drop in the combustor is directly impairing power and efficiency of a gas turbine.

Figure 2:
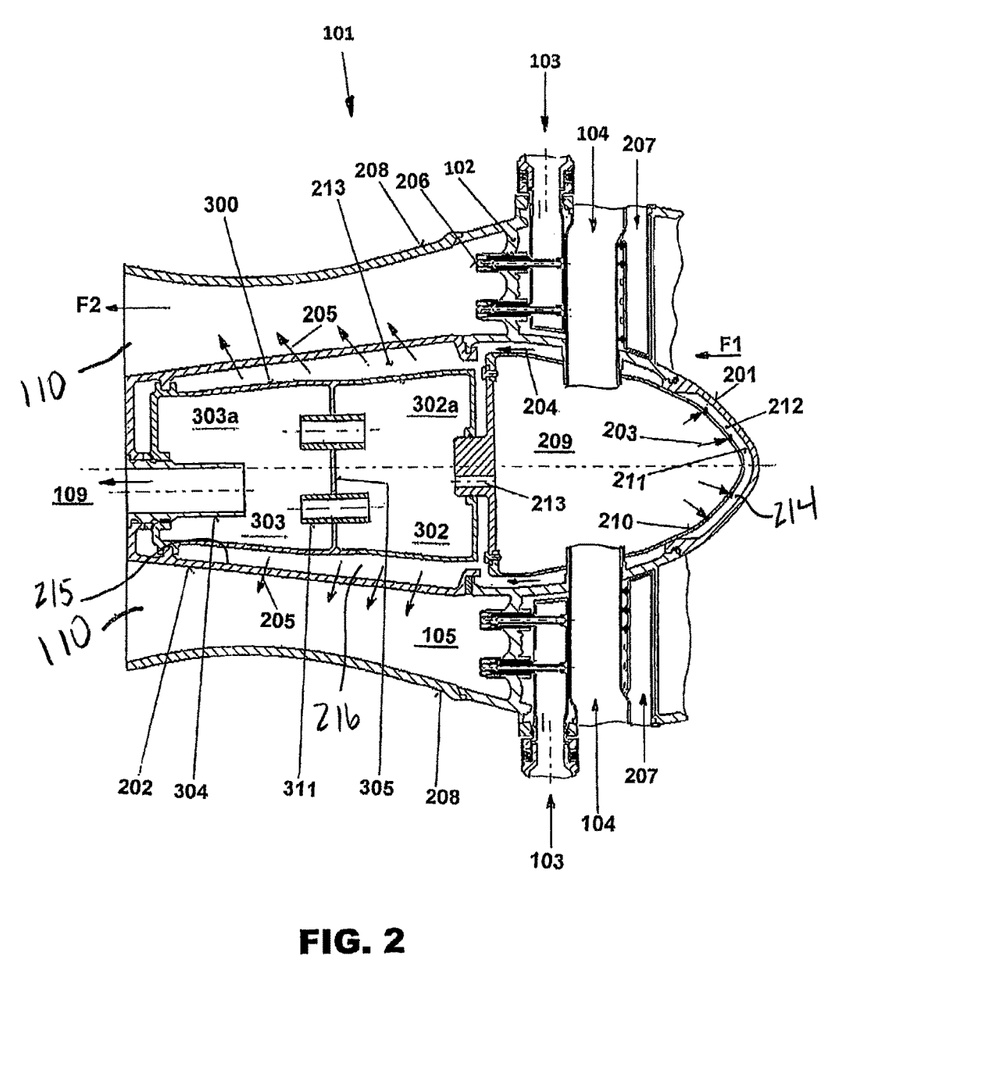
FIG. 2 shows an assembly of a center body burner in a cross sectional view.

FIG. 2 shows an assembly of a center body burner 101 in a cross sectional view. The front section 201 of the center body burner 101 having with respect to the main flow F1 a flow-compliant rounded front which is cooled by impingement cooling 203, wherein the cooling air 203 for this purpose is supplied through the main air cooling channel 104. The extension of the front section 201 in the flow direction 202 includes in radial direction a placement of a number of lobes 102 which are circumferentially disposed. Subsequently, the medium flow F2 in longitudinal direction of the gas/fuel-flow in the annular duct 105 of the center body burner 101 is connected to the combustion chamber 109.

The cooling air supplied through the circumferentially disposed main cooling channels 104 flows at high pressure in the cooling volume 209 and strikes against the inner wall 210 of the center body burner 101. The cooling air passing through the channels 104 forms a divergently impingement air cooling stream within the cooling volume 209 and impinges on a greater region of the center body burner front section 201.

The impingement cooling 203 is particularly effective if, according to a preferable proposed embodiment, the impingement cooling inner wall 210 is arranged at a distance parallel to the rear side 211 of the front section 201 of the center body burner 101, and if the distribution of the impingement cooling holes 214 is matched to the distribution of the pins (not shown) within the cavity 212 in such a way that the impingement cooling holes 214 lie between the pins in each case, as seen in a direction perpendicular to the impingement cooling plate.

The variation of the cooling can be intensified by the density of the impingement cooling holes 214 being correlated with the density of the pins. In particular, the density of the impingement cooling holes 214 and the density of the pins can locally be the same.

For this, the cavity 212, which is covered by the impingement cooling inner wall 210 arranged parallel to the front section 201 of the center body burner 101 is formed on the upper side of the front section 201. Provision is made in the impingement cooling inner wall 210, in a pre-specified distribution, for impingement cooling holes 214 through which the compressed cooling air in the form of individual cooling air jets enter the cavity 212 and impinge upon the oppositely disposed rear side 211 of the front section 201 of the center body burner 101.

During the impingement and the subsequently following turbulent contact with the rear side 211 of the front section 201 of the center body burner 101, the cooling air absorbs heat from the front section 201 of the center body burner 101 and is then discharged from the cavity 212.

For improving the transfer of heat between front section 201 of the center body burner 101 and the cooling air 104, perpendicularly projecting conical or pyramid-shaped pins are arranged on the rear side 211 of the front section 201 of the center body burner 101 and enlarge the contact area between wall and cooling air flow and intensify the turbulences. The density of the impingement cooling holes 214 and the density of the pins is locally different but correlated with each other at the same time, i.e. in the regions where the density of the pins is increased (concentrated regions) the density of the impingement cooling holes 214 is also increased, and vice versa. The impingement cooling holes 214 are preferably arranged with the pins, if required, in a "staggered" manner that is to saying holes 214 with the same periodicity are positioned in a staggered manner in each case.

As a result of this, the heat dissipation in the region of the front section 201 of the center body burner 101 is significantly improved, as a result of which the effects of the thermal load can be limited.

While the impingement cooling has been described with reference to particular embodiments thereof, it will be understood by those having ordinary skill the art that various changes may be made therein without departing from the scope and spirit of the invention. Further, the present description is not limited to the embodiments described herein.

After the described impingement cooling process the cooling air continues to flow in longitudinal direction of a transition duct 204 in the region of the lobes 102 (middle face), and then this cooling air flows within a subsequently arranged annular channel 213 in longitudinal direction of the back face of the center body burner. This transition duct 204 is positioned in axial direction between the outer periphery of a damper 300 and the liner 215 of the back face 202 of the center body burner 101. The cooling air from the impingement cooling cools thereafter the transition duct 204 (middle face) and subsequently the back face 202 forming the annular channel 216 with a convective and/or an effusion cooling. The back face 202 of the center body burner 101 should be preferably cooled by an effusion cooling.

Accordingly, the plurality of effusion cooling holes 214 are positioned in the outer skin member of the back face 202 preferably at an angle of about 15 to 30 degrees and extend at least of a part of the annular channel 213, and the effusion cooling holes 214 are connected to the mixing space 105. Additional ones of the plurality of effusion cooling holes 214 are positioned in additional rows in longitudinal direction of the transition duct 204.

The lobes 102 respectively the fuel nozzles 206 are supplied with fuel 103 and further cooling air 207.

The damper 300 comprising for its operation at least one bore 213 between the cooling volume 209 and the first damper's volume 302a, at least one neck 311 between the first damper's volume 302a and the second damper's volume 303a, at least one passage 304 between the second damper's volume 303b and the combustion chamber 109.

The center body burner 101 operated in a can-combustor as self-contained cylindrical or quasi-cylindrical combustion chamber. Fundamentally, each can-combustor has its own fuel injector, igniter, liner, casing, cooling, etc. A can-combustor can operate as a self-ignition sequential combustion chamber (SEV). In most applications, multiple can-combustors are arranged around the central axis of the engine, and their shared exhaust is fed to the turbine(s). Can-combustors are easy to maintain, as only a single can-combustor needs to be removed, rather than the whole combustion section.

The next type of combustor is the annular-can-combustor. The annular-can-combustors architecture has discrete combustion zones contained in separate liners with their own fuel injectors. Unlike the can-combustor, all the combustion zones share a common ring (annulus) casing.

Figure 3:
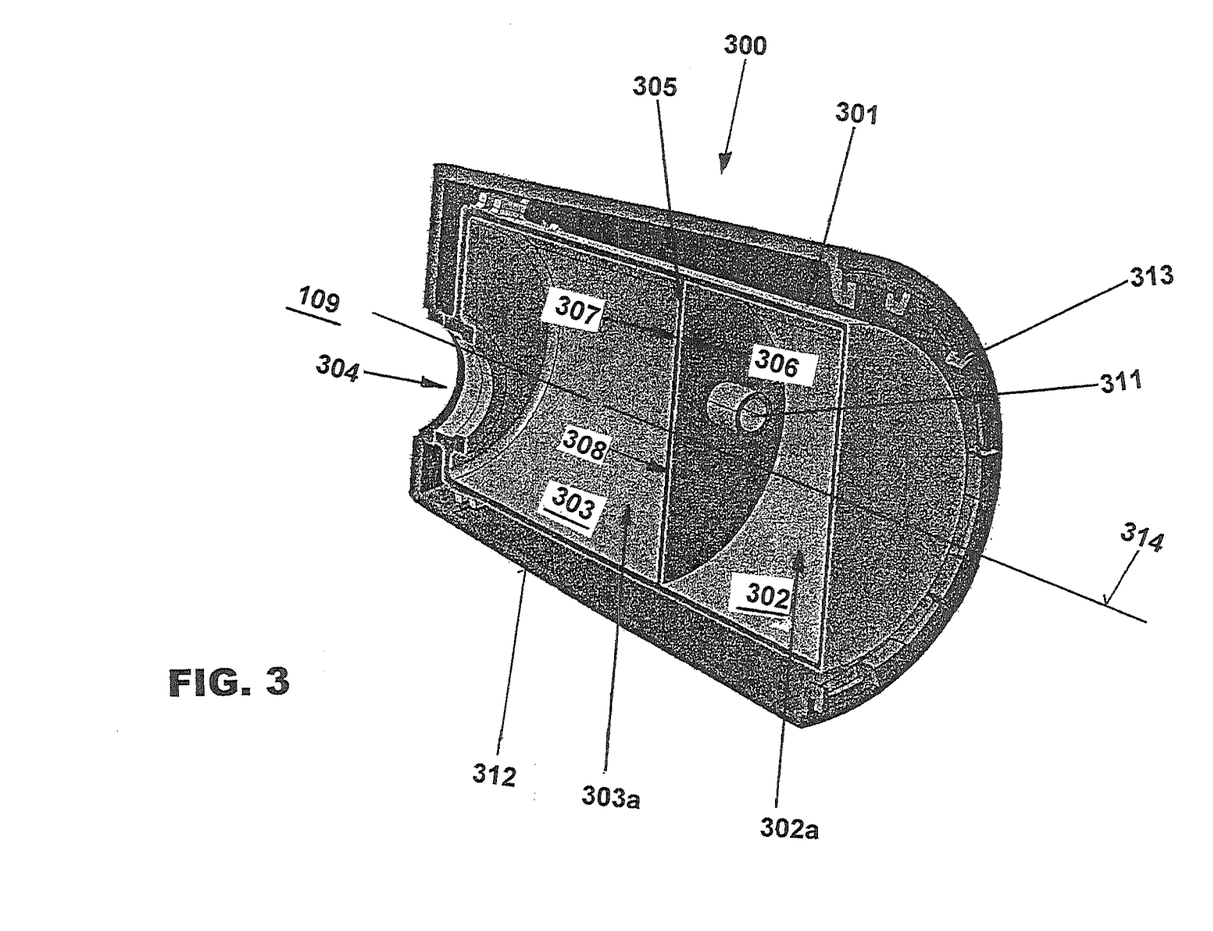
FIG. 3 shows a three dimensional configuration of a damper.

FIG. 3 shows a three dimensional configuration of a damper 300, especially of a low frequency damper. Within the scope of the technical aim in connection with a burner, an aspect of the embodiment is to provide a damper arrangement and a method for designing same that permit damping of pressure oscillations in a large damping bandwidth, in particular when compared to the bandwidth of traditional damp arrangements made of Helmholtz dampers.

A further aspect of the proposed arrangement is to provide a damper arrangement that is able to cope with the frequency shifting of the pressure oscillations with no or limited need of fine tuning. Another aspect of the proposed arrangement is to provide a damper arrangement that is very simple, in particular when compared to the traditional damper arrangements described above.

In effect, the technical aim, together with these and further aspects, are attained according to the invention by providing a damper arrangement and a method for designing same in accordance with the accompanying claims.

In particular, the damper 300 of FIG. 3 consists of an inner cylinder 301 and an outer cylinder 312 and the inner cylinder comprising two chambers 302, 303. The first chamber 302 defines the first volume 302a and the second chamber 303 defines the second volume 303a. Thus the first volume 302a is arranged downstream of the center body 101 and the second volume is arranged upstream of the combustion chamber 109 (see FIGS. 1 and 2). Moreover, the first volume 302a is connected by means of at least one bore 213 (see FIG. 2) to the cooling air flow within the center body; the second volume 303a is connected by means of a passage 304 to the combustion area 109 of the combustion chamber (see FIG. 2). The passage is located eccentrically with respect to the center line 314 of the inner cylinder 301.

In this respect FIG. 3 shows that the first volume 302a is delimited by the second volume 303a by a partition wall 305 consisting of two intermediate walls 306, 307. The intermediate walls 306, 307 comprising to one another a sealing mat 308. The intermediate walls having two alignable holes 309, 310 and at the first volume 302a and the second chamber 303 defines the second volume 303a with variable cross section to defining by the aligned holes 311 of the partition wall 305. An outer cylinder 312 takes the assembly to the center body 101 by means of bayonet look 313.

Figure 4:
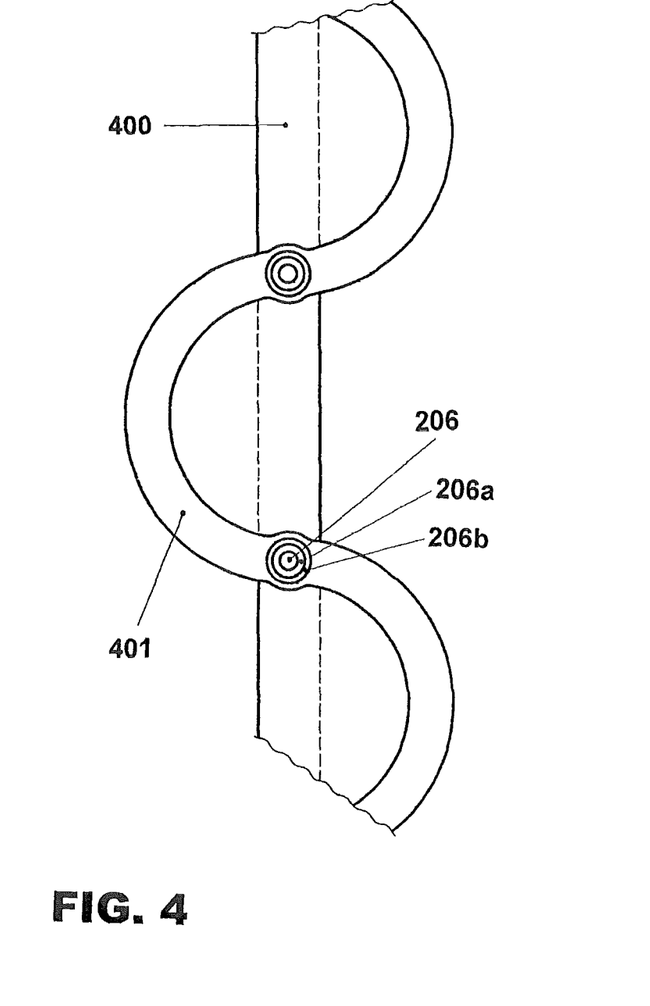
FIG. 4 show views against the main flow onto the trailing edge of lobed flutes.

FIG. 4 shows an arrangement where first nozzles 206 for injection of liquid fuel, are enclosed by second nozzles 206a for injection of a gaseous fuel, which themselves are encloses by third nozzles 206b for injection of carrier air. The nozzles 206, 206a, 206b are arranged concentrically at the trailing edge of each lobe 102. Each nozzle arrangement is located where the flute 401 crosses the center plane of the trailing edge 400 of the lobe (see FIG. 2).

The invention claimed is:

1. A burner arrangement for using in a single combustion chamber or in a can-combustor comprising
a center body burner located upstream of a combustion zone;
an annular duct with a cross section area; and
intermediate lobes which are arranged in circumferential direction and in longitudinal or quasi-longitudinal direction of the center body burner,
wherein the lobes being actively connected to the cross section area of the annular duct,
wherein cooling air is guided through a number of pipes within the lobes to the center body burner and based on impingement cooling cools beforehand at least a front section of the center body burner and in a subsequent flow the impingement cooling air based on convective and/or effusion cooling cools a middle and a back face of the center body burner, and
wherein at least the back face of the center body burner includes on the inside at least one damper.

2. The burner arrangement according to claim 1, wherein the damper is operatively designed as low frequency damper.

3. The burner arrangement according to claim 1, wherein the front section of the center body burner having an impingement cooling cavity disposed between a rear side of the front section of the center body burner and an impingement cooling inner wall.

4. The burner arrangement according to claim 1, wherein the cooling air from a cavity is directly or indirectly connected with a transition duct in a longitudinal direction of the middle face of the center body burner and in a longitudinal direction of a subsequent annular channel within the back face of the center body burner.

5. The burner arrangement according to claim 1, wherein the lobes having a streamlined cross-sectional profile in a flow direction, wherein the lobes extend in a longitudinal direction perpendicularly or at an inclination to a prevailing main flow direction, wherein a leading edge area of each lobe has a profile, which is streamlined and oriented to the prevailing main flow direction, and wherein, with reference to a central plane, a trailing edge of each lobe is provided with at least one flute, wherein the flutes in longitudinal or quasi longitudinal direction of all lobes run in conjunction with each other in a same direction and/or in opposite transverse directions.

6. The burner arrangement according to claim 5, wherein each lobe comprises in a region of the trailing edge at least one fuel nozzle for introducing at least one fuel into the burner, wherein the fuel nozzle is actively connected to the flute.

7. The burner arrangement according to claim 1, wherein a leading edge region of each lobe has an aerodynamic profile, which is turning from an inclined orientation relative to a longitudinal axis of flow direction to an orientation, which is parallel or quasi-parallel to a longitudinal axis of the flow direction at least in an upstream half of each lobe.

8. The burner arrangement according to claim 1, wherein each lobe is provided with cooling elements, wherein these cooling elements are given by internal circulation of cooling medium in a longitudinal or quasi-longitudinal direction of sidewalls of each lobe and/or by film cooling holes, the cooling elements are located near a trailing edge, and wherein the cooling elements are fed with air from a carrier gas feed also used for fuel injection.

9. The burner arrangement according to claim 6, wherein the at least one fuel nozzle is circular and/or are elongated slot nozzles extending in a longitudinal or quasi-longitudinal direction of the trailing edge of the streamlined body and/or comprise a first nozzle for injection of liquid and/or a second nozzle for injection of a gaseous fuel, and a third nozzle for injection of carrier air, which encloses the first and/or the second nozzle.

10. The burner arrangement according to claim 1, wherein downstream of the lobes a mixing zone is located, and wherein at and/or downstream of said lobes the cross-section of said mixing zone is reduced, wherein this reduction is at least 10%, at least 20%, or at least 30%, compared to the flow cross-section upstream of said lobes.

11. The burner arrangement according to claim 1, wherein downstream of the lobes a mixing zone is located, and wherein at and/or downstream of said lobes the cross-section of said mixing zone is enlarged, wherein this enlargement is at least 10%, at least 20%, or at least 30%, compared to a flow cross-section upstream of said lobes.

12. The burner arrangement according to claim 1, wherein downstream of the lobes a mixing zone is located, and wherein at and/or downstream of said lobes a cross-section of said mixing zone having the form of a diffusor.

13. A method for operating a burner arrangement according to claim 1, wherein at least one injection plane is used for at least one burner for a combustion chamber of a gas turbine group, wherein the gas turbine group includes at least one compressor unit, and a first combustion chamber for generating working gas, wherein the first combustion chamber is connected to receive compressed air from the compressor unit, wherein the first combustion chamber is an annular combustion chamber having a plurality of premixing burners, a first turbine connected to receive working gas from the first combustion chamber, a second combustion chamber connected to receive exhausted working gas from the first turbine, and deliver working gas to a second turbine, wherein the second combustion chamber comprises an annular duct forming a combustion space extending in a flow direction from an outlet of the first turbine to an inlet of the second turbine, and the second combustion chamber comprising means for introducing fuel into the second combustion chamber for self-ignition of the fuel.

14. A method for operating a burner arrangement according to claim 1, wherein at least one injection plane is used for at least one burner for a combustion chamber of a gas turbine group, wherein the gas turbine group includes at least one compressor unit, a first combustion chamber for generating working gas, wherein the first combustion chamber is connected to receive compressed air from the compressor unit, wherein the first combustion chamber is an annular combustion chamber having a plurality of premixing burners, a first turbine connected to receive working gas from the first combustion chamber, a second combustion chamber connected to receive exhausted working gas from the first turbine and deliver working gas to a second turbine, wherein the second combustion chamber is operating as a can-combustor which is designated as a self-contained cylindrical or quasi-cylindrical combustion chamber, and the can-combustor including means for introducing fuel into the second combustion chamber for self-ignition of the fuel.

15. The method for operating a burner arrangement according to claim 14, wherein multiple can-combustors are arranged around the central axis of the gas turbine group.

* * * * *